(12) United States Patent
Pressnall

(10) Patent No.: US 6,259,103 B1
(45) Date of Patent: Jul. 10, 2001

(54) LIGHT BEAM DETECTOR

(75) Inventor: Timothy A. Pressnall, Albuquerque, NM (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 09/197,542

(22) Filed: Nov. 12, 1998

(51) Int. Cl.⁷ .................................................. G01J 5/48
(52) U.S. Cl. ..................... 250/483.1; 250/330; 250/486.1
(58) Field of Search ........................... 250/483.1, 486.1, 250/330

(56) References Cited

U.S. PATENT DOCUMENTS 5,055,695 * 10/1991 Lange ................................. 250/459.1
6,034,371 * 3/2000 Kormos et al. ....................... 250/351

FOREIGN PATENT DOCUMENTS 4-285825 * 10/1992 (JP) ....................................... 250/351
5-248248 * 9/1993 (JP) ..................................... 250/483.1

OTHER PUBLICATIONS

Lumitekl Photonic Products. Product overview and specifications [online]. Lumitek International, Inc., 2000. [retrieved on 2000–06–26]. Retrieved from the Internet: <URL: www.us.net/quantex/Sensor2.html>.*

* cited by examiner

Primary Examiner—Constantine Hannaher
(74) Attorney, Agent, or Firm—Thomas C. Stover

(57) ABSTRACT

Provided is a detector for an IR laser beam which has a chopper wheel of alternating spokes and spaces, the spokes having phosphor coatings thereon. The chopper wheel is placed in the path of the beam and rotated so the IR beam forms a visible or luminous spot on the rotating phosphor coats which are recharged. Intermittently, the IR beam passes through the rotating openings between the spokes to continue on its path to a mirror or target and the like. At the same time, as noted above, the beam forms a visible spot on the rotating phosphor coatings so as to depict the location, size and quality of the normally invisible IR beam.

15 Claims, 2 Drawing Sheets

SIDE VIEW

Quantex's Model Q-42 RSS090

LIGHT BEAM DETECTOR

CROSS REFERENCE TO RELATED PATENT APPLICATIONS

Not applicable.

STATEMENT REGARDING FEDERALLY SPONSORED RESEARCH OR DEVELOPMENT

The invention described herein may be manufactured and used by and for the government for governmental purposes without the payment of any royalty thereon.

BACKGROUND OF THE INVENTION

1. Field of the Invention

This invention relates to beam detection, particularly detection of light beams.

2. Description of Related Art

In aligning beam emitters, e.g., IR lasers, one often uses phosphor cards that need to be charged with ambient or UV/light sources. However, when a laser beam strikes the card, the image of the laser beam soon bleaches out the phosphor. Accordingly, one needs to recharge the card or move it so that the beam strikes a spot that has not been bleached.

Also in the prior art is a "Quantex" model which has a glass disc having a coating of phosphor thereon which is rotated in the path of an IR laser beam. On the other side of the disc is mounted a UV or LED (blue light emitter) which recharges the phosphor that has been bleached by the IR beam, such that a continuously illuminated spot appears on the rotating disc showing the location of the laser beam. However, the path of the beam is blocked by such disc to the detriment of target or mirror alignment.

Accordingly, there is need and market for a "pass-through" beam detector that overcomes the above prior art shortcomings.

There's now been discovered a renewable beam detector which can provide an illuminated beam spot on a surface so as to provide the location and other characteristics of the beam and also to permit passage of the beam through the detector.

In the prior art is noted U.S. Pat. No. 4,980,565 to Jehle (1973) but it relates to an electro-optic target acquisition system.

BRIEF SUMMARY OF THE INVENTION

Broadly the present invention provides a light beam detector comprising, a) a rotatable body having a surface with at least one opening therein,
b) at least one phosphor coating being mounted on the surface,
c) means for directing a light beam on a path and
d) means for rotating said body across the path and the beam so that the beam forms a visible spot on the rotating phosphor coating of the body while intermittently passing through the opening to continue on it's path so as to depict the location of the beam.

By "light beam", as used herein, is meant, a beam in the visible or non visible spectrum including an IR beam.

By "phosphor coating" as used herein, is meant a coating up to 0.005 to 0.010 in. thick or more and preferably within such range.

BRIEF DESCRIPTION OF THE DRAWINGS

The invention will become more apparent from the following detailed specification and drawings in which.

DETAILED DESCRIPTION OF THE INVENTION

Figure 1:
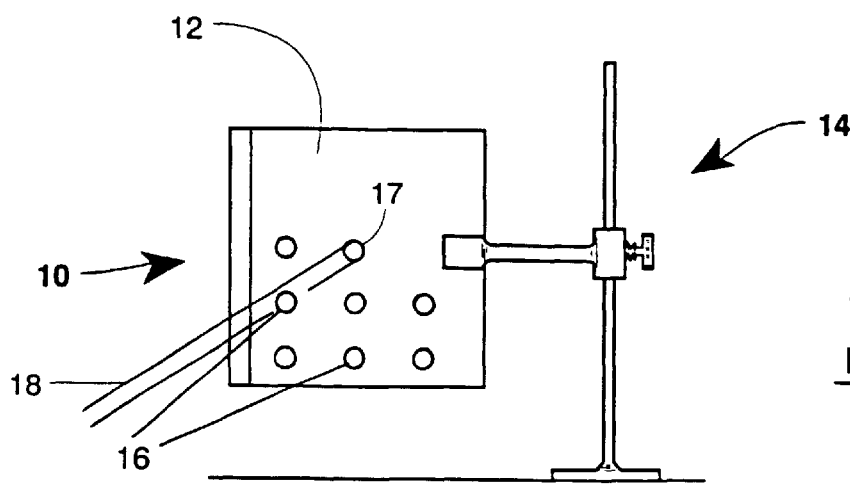
FIG. 1 is a fragmentary elevation schematic view of an early manual IR beam detector.

Referring in more detail to the drawings, a card 10 having a phosphor coating 12 is held by a manual support stand 14, which card 10 is adjusted to various positions as various bleach spots 16 are formed by an IR laser beam 18 on the card 10, as shown in FIG. 1. Thus it is necessary to keep moving the card 10 so that an unbleached portion of the phosphor coating 12 may be illuminated in a new spot 17 to locate the position of the laser beam 18 thereby.

Figure 2:
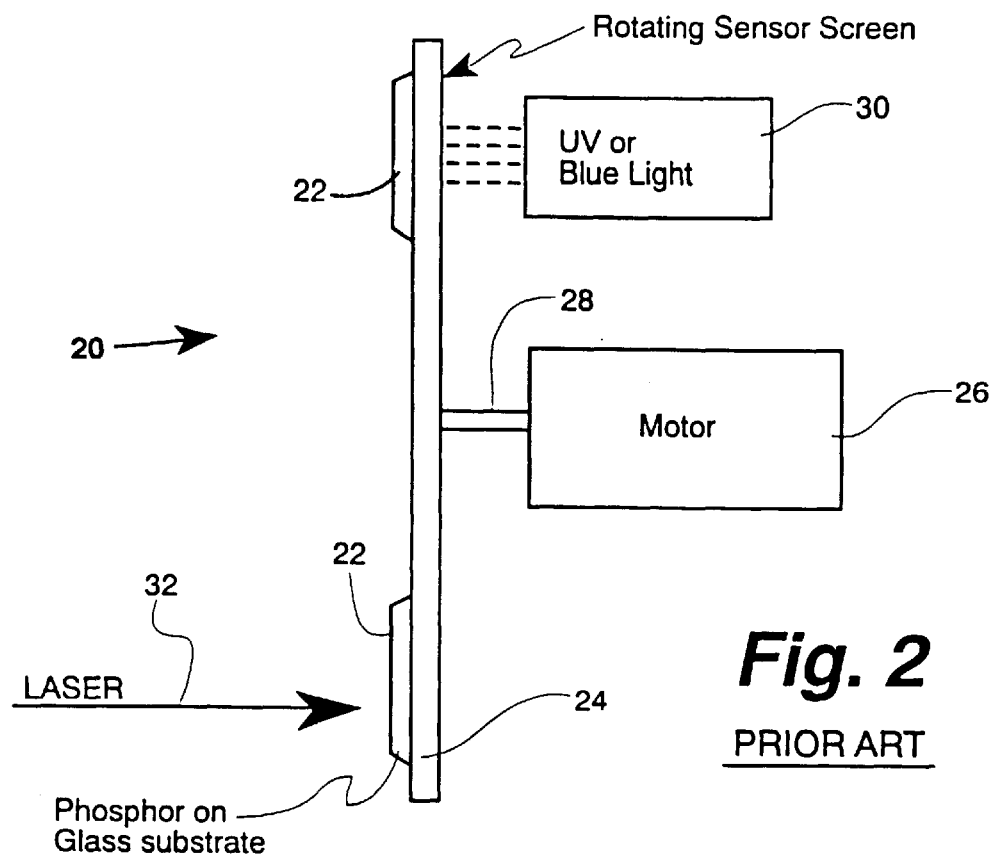
FIG. 2 is a schematic elevation view of a more recent prior art IR beam detector.

In a more advanced apparatus of the prior art, an IR beam detector 20 has a phosphor coating 22 on a glass disc 24, which is rotated by a motor 26 and an axle 28, as shown in FIG. 2. Here a charging source 30 of UV or LED (blue) light recharges the bleached portions of the rotating phosphor coating 22, so that IR laser beam 32 can project a continuously illuminated spot (not shown) on the rotating phosphor coating 22.

Figure 3:
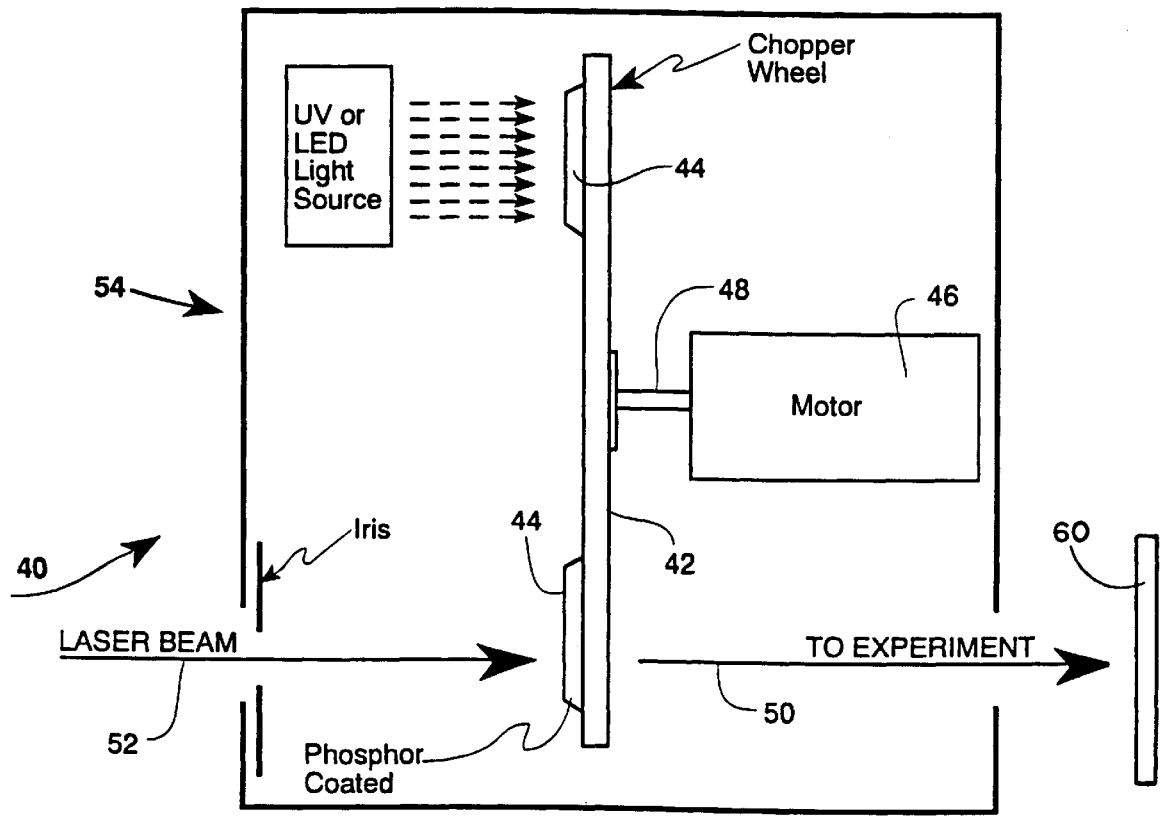
FIG. 3 is a schematic side elevation view of an IR beam detector embodying the invention and FIG. 4 is a front elevation view of a component of the IR beam detector of FIG. 3.

In an IR beam detector 40, per the present invention, shown in FIG. 3, a chopper wheel 42 has a phosphor coating 44 thereon which is rotated by a motor 46 and a drive shaft 48 so as to rotate the phosphor coating 44 into the path 50 of an IR laser beam 52, as shown. The beam 52 passes through an opening in a shadow box 54 to illuminate a spot (not shown) on the phosphor coating 44, as indicated in FIG. 3. Mounted proximate the upper portion of the chopper wheel 42 is a UV or LED blue light source which recharges the phosphor coating 44 as it rotates by so as to present a charged phosphor coating to the incoming IR laser beam 52, to maintain a visible spot (not shown) on the rotating phosphor coating 44.

Figure 4:
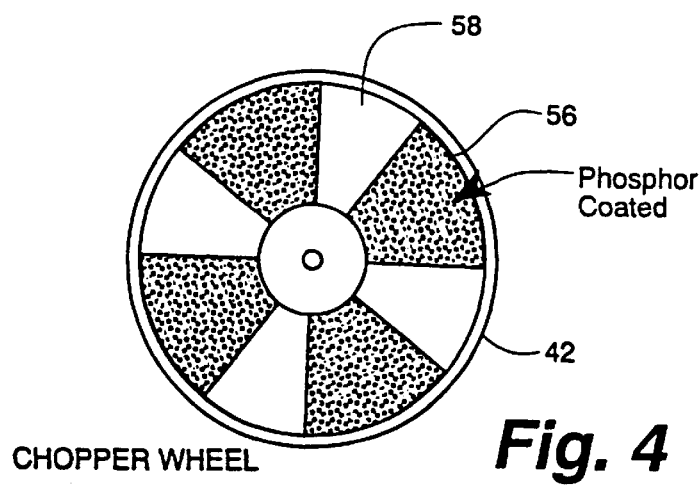

However, the present invention does more than locate an IR laser beam by a visible spot on the phosphor coating, it intermittently permits the laser beam to pass through the chopper wheel, for directional and, e.g., target alignment and target contact purposes at the same time. That is, as shown in FIG. 4, the chopper wheel of the invention 42 has phosphor coated sections 56, adjacent open space sections 58 so that upon rotation of such wheel 42, the viewer can see an illuminated spot on the phosphor coating, which locates the laser beam and may also see where the IR beam 52 goes per FIGS. 3 and 4 and make directional adjustments of the beam for precise alignment thereof with, e.g., mirror, target and the like 60.

Thus the beam detector of the invention and its rotating chopper wheel, give the appearance of a beam spot floating in space and the location of such spot coupled with the emitting point of the laser provide two reference points that permits the user to see where the laser beam is going and to correct the direction thereof as needed during an IR beam test. That is, the beam detector of the invention and its chopper wheel can become an integral part of an operation or a test, as a means of placing a non-invasive diagnostic tool in the operation to monitor the location, size, and quality of an IR laser beam.

What is claimed is:

1. A light beam detector comprising,
   a) a rotatable body having a surface with at least a pair of openings symmetrically disposed about the axis thereof,
   b) at least one phosphor coating mounted on the surface,
   c) means for directing a light beam on a path and
   d) means for rotating said body across the path and the beam so that the beam forms a visible spot on the rotating phosphor coating of the body while said beam intermittently passes through said openings to continue on its path so as to depict the location of the beam.

2. The detector of claim 1 wherein said body has a plurality of symmetrical openings therein and is free of an overlapping support frame.

3. The detector of claim 1 wherein said body is a chopper wheel.

4. The detector of claim 3 wherein said wheel has spokes coated with phosphor.

5. The detector of claim 3 wherein said beam passes through said wheel onto a target.

6. The detector of claim 3 wherein said chopper wheel is rotated by a motor.

7. The beam detector of claim 3 wherein said beam illuminates a spot on the rotating chopper wheel to depict the location, size, quality or direction of said beam.

8. The detector of claim 1 wherein said beam is selected from the group of an IR beam, a laser beam and an IR laser beam.

9. The detector of claim 1 having means to recharge said phosphor coatings after they are contacted by said beam.

10. The detector claim 9 wherein the recharging means is a UV or LED light source directed to said phosphor coatings as they rotate by.

11. The detector of claim 1 mounted in a shadow box.

12. The detector of claim 1 wherein said body has a plurality of spaced blades extending from a hub.

13. The detector of claim 1 wherein said body has a hub and a rim with spaced blades or spokes extending therebetween.

14. The detector of claim 13 having phosphor coatings on said blades or spokes.

15. The detector of claim 1 wherein said body is a disc having at least two opening therein.

* * * * *